(12) United States Patent
Ikawa

(10) Patent No.: US 9,792,569 B2
(45) Date of Patent: Oct. 17, 2017

(54) LOGISTICS SYSTEM

(71) Applicant: Daifuku Co., Ltd., Osaka (JP)

(72) Inventor: Kouichi Ikawa, Osaka (JP)

(73) Assignee: DAIFUKU CO., LTD., Osaka (JP)

( * ) Notice: Subject to any disclaimer, the term of this patent is extended or adjusted under 35 U.S.C. 154(b) by 388 days.

(21) Appl. No.: 14/488,955

(22) Filed: Sep. 17, 2014

(65) Prior Publication Data

US 2015/0088581 A1     Mar. 26, 2015

(30) Foreign Application Priority Data

Sep. 20, 2013   (JP) ................................. 2013-195802

(51) Int. Cl.
*G06Q 10/06*    (2012.01)
*G06Q 10/08*    (2012.01)

(52) U.S. Cl.
CPC ....... *G06Q 10/06313* (2013.01); *G06Q 10/08* (2013.01)

(58) Field of Classification Search
None
See application file for complete search history.

(56) References Cited

U.S. PATENT DOCUMENTS

| | | | | |
|---|---|---|---|---|
| 6,356,838 B1* | 3/2002 | Paul | ................... | G01C 21/3453 |
| | | | | 701/410 |
| 7,684,994 B2* | 3/2010 | Kodger, Jr. | ........... | G06Q 10/025 |
| | | | | 235/375 |
| 8,219,312 B2* | 7/2012 | Davidson | ............... | G01C 21/32 |
| | | | | 701/409 |
| 8,315,802 B2* | 11/2012 | Brown | ................. | G06Q 10/047 |
| | | | | 701/400 |
| 8,433,659 B2* | 4/2013 | Johnston | ............ | G06Q 30/0205 |
| | | | | 705/1.1 |
| 8,498,947 B1* | 7/2013 | Haake | .................. | G06Q 10/047 |
| | | | | 705/338 |
| 8,655,487 B2* | 2/2014 | Hurley | ................... | G01C 21/32 |
| | | | | 700/245 |

(Continued)

FOREIGN PATENT DOCUMENTS

| | | | |
|---|---|---|---|
| JP | H7-073397 A | | 3/1995 |
| JP | 2000-348296 A | | 12/2000 |

(Continued)

OTHER PUBLICATIONS

Japanese Office Action dated Aug. 30, 2016, with an English translation thereof.

*Primary Examiner* — Thomas L Mansfield, Jr.
(74) *Attorney, Agent, or Firm* — McGinn IP Law Group, PLLC.

(57) ABSTRACT

A logistics system includes a control unit, an actual arrival time acquisition section, and a storage section. The control unit calculates estimated arrival time of each transport vehicle at a logistics center. The actual arrival time acquisition section acquires actual arrival time of the each transport vehicle at the logistic center. The storage section stores actual difference information. The control unit calculates a corrected estimated arrival time of the transport vehicle at the logistics center based on the estimated arrival time of the transport vehicle at the logistics center and the actual difference information. The control unit makes an item assortment plan based on the corrected estimated arrival time.

17 Claims, 10 Drawing Sheets

(56) References Cited

U.S. PATENT DOCUMENTS

| | | | | |
|---|---|---|---|---|
| 2005/0154626 A1* | 7/2005 | Jones | ............ | G06Q 10/08 |
| | | | | 705/7.12 |
| 2006/0217885 A1* | 9/2006 | Crady | ............ | G01C 21/00 |
| | | | | 701/469 |
| 2006/0235739 A1* | 10/2006 | Levis | ............ | G06Q 10/08 |
| | | | | 705/1.1 |
| 2009/0326991 A1* | 12/2009 | Wei | ............ | G06Q 10/02 |
| | | | | 705/5 |
| 2014/0249667 A1* | 9/2014 | Suzuki | ............ | H01L 21/67276 |
| | | | | 700/228 |

FOREIGN PATENT DOCUMENTS

| | | | |
|---|---|---|---|
| JP | 2002-321829 A | 11/2002 | |
| JP | 2002-350165 A | 12/2002 | |
| JP | 2006-96553 A | 4/2006 | |

\* cited by examiner

Fig. 6

| WORK CODE | ESTIMATED ARRIVAL PERIOD S | ACTUAL TIME DIFFERENCE | COEFFICIENT K | CIRCUMSTANCE FACTOR ||||||| DIRECTION NUMBER |
|---|---|---|---|---|---|---|---|---|---|---|
| | | | | MONTH | DAY OF THE WEEK | TIME ZONE | HOLIDAY | "GOTOBI" | WEATHER | |
| 2013091001 | 30 | 5 | 1.17 | 9 | TUE | 9-12 | N | Y | FINE | 1 |
| 2013091002 | 30 | -3 | 0.90 | 9 | TUE | 12-15 | N | Y | FINE | 4 |
| ... | ... | ... | ... | ... | ... | ... | ... | ... | ... | ... |
| 2013091101 | 30 | 8 | 1.27 | 9 | TUE | 12-15 | N | N | CLOUDY | 8 |
| ... | ... | ... | ... | ... | ... | ... | ... | ... | ... | ... |
| 2013091201 | 30 | -5 | 0.83 | 9 | THU | 9-12 | N | N | FINE | 6 |
| 2013091202 | 30 | 3 | 1.10 | 9 | THU | 15-18 | N | N | FINE | 11 |
| ... | ... | ... | ... | ... | ... | ... | ... | ... | ... | ... |
| 2013091502 | 30 | 0 | 1.00 | 9 | SUN | 12-15 | Y | Y | RAINY | 3 |
| ... | ... | ... | ... | ... | ... | ... | ... | ... | ... | ... |
| 2013091602 | 30 | 1 | 1.03 | 9 | MON | 12-15 | Y | N | CLOUDY | 6 |

Fig. 7

| CIRCUMSTANCE FACTOR: DAY OF THE WEEK, DIRECTION NUMBER | | | | | | | |
|---|---|---|---|---|---|---|---|
| DAY OF THE WEEK | MON. | TUE. | WED. | THU. | FRI. | SAT. | SUN. |
| DIRECTION NUMBER 1 | 1.1 | 1.0 | 0.9 | 0.9 | 1.2 | 0.9 | 0.7 |
| DIRECTION NUMBER 2 | 1.0 | 1.0 | 0.8 | 0.7 | 1.1 | 0.9 | 0.5 |
| DIRECTION NUMBER 3 | 1.1 | 1.0 | 0.9 | 0.8 | 1.2 | 0.8 | 0.6 |
| DIRECTION NUMBER 4 | 1.1 | 1.0 | 0.9 | 0.9 | 1.2 | 0.9 | 0.7 |
| DIRECTION NUMBER 5 | 1.0 | 1.0 | 0.8 | 0.7 | 1.2 | 0.9 | 0.6 |
| DIRECTION NUMBER 6 | 1.1 | 1.0 | 0.9 | 0.9 | 1.2 | 0.9 | 0.8 |
| DIRECTION NUMBER 7 | 1.1 | 1.0 | 0.9 | 0.8 | 1.2 | 0.9 | 1.0 |
| DIRECTION NUMBER 8 | 1.2 | 1.0 | 0.7 | 0.7 | 1.2 | 0.9 | 0.8 |
| DIRECTION NUMBER 9 | 1.0 | 1.0 | 0.8 | 0.7 | 1.2 | 0.9 | 0.7 |
| DIRECTION NUMBER 10 | 1.1 | 1.0 | 0.9 | 0.9 | 1.2 | 0.9 | 0.9 |
| DIRECTION NUMBER 11 | 1.0 | 1.0 | 0.9 | 0.8 | 1.2 | 0.9 | 0.7 |
| DIRECTION NUMBER 12 | 1.1 | 1.0 | 0.9 | 0.9 | 1.2 | 0.9 | 0.7 |

| CIRCUMSTANCE FACTOR: WEATHER, DIRECTION NUMBER | | | | | | |
|---|---|---|---|---|---|---|
| WEATHER | FINE | CLOUDY | LIGHT RAIN | HEAVY RAIN | SNOW | STRONG WIND |
| DIRECTION NUMBER 1 | 1.0 | 1.0 | 0.9 | 1.3 | 1.2 | 1.2 |
| DIRECTION NUMBER 2 | 1.0 | 1.0 | 0.8 | 1.2 | 1.2 | 1.1 |
| DIRECTION NUMBER 3 | 1.0 | 1.0 | 0.9 | 1.2 | 1.3 | 1.2 |
| DIRECTION NUMBER 4 | 1.0 | 1.0 | 1.1 | 1.5 | 1.2 | 1.2 |
| DIRECTION NUMBER 5 | 1.0 | 1.0 | 0.8 | 1.6 | 1.0 | 1.2 |
| DIRECTION NUMBER 6 | 1.0 | 1.0 | 0.9 | 1.2 | 1.8 | 1.2 |
| DIRECTION NUMBER 7 | 1.0 | 1.0 | 1.2 | 1.2 | 1.4 | 1.2 |
| DIRECTION NUMBER 8 | 1.0 | 1.0 | 1.2 | 1.3 | 1.2 | 1.2 |
| DIRECTION NUMBER 9 | 1.0 | 1.0 | 0.8 | 1.5 | 1.0 | 1.2 |
| DIRECTION NUMBER 10 | 1.0 | 1.0 | 0.9 | 1.5 | 0.9 | 1.2 |
| DIRECTION NUMBER 11 | 1.0 | 1.0 | 0.9 | 1.2 | 0.8 | 1.2 |
| DIRECTION NUMBER 12 | 1.0 | 1.0 | 0.9 | 1.8 | 1.2 | 1.2 |

Kh

LOGISTICS SYSTEM

CROSS REFERENCE

This application claims a priority based on Japan Patent Application No. JP 2013-195802 filed on Sep. 20, 2013, the disclosure of which is hereby incorporated by reference herein in its entirety.

TECHNICAL FIELD

The present invention relates to a logistics system for making an item assortment plan based on estimated arrival time of a transport vehicle at a logistics center.

BACKGROUND ART

As to a logistics system, a technique in which estimated arrival time of a transport vehicle is calculated, an item assortment plan making process for making an item assortment plan is executed so as to be able to complete an item assortment before the estimated arrival time, and an item assortment order process for instructing item assortment work based on the item assortment plan is executed is known (for example, refer to a patent literature 1).

It is desirable that an assortment of items to be loaded in a transport vehicle has been completed before the transport vehicle arrives at a logistics center. However, if completion time of the assortment work and actual arrival time of the transport vehicle are diverged from each other, a temporary storage area of a track berth is occupied by the items to be loaded in the transport vehicle during a period before the transport vehicle arrival. As a result, operation efficiency of the facilities of the logistics center is reduced. Therefore, it is required to match the completion time of the assortment work and the actual arrival time of the transport vehicle as much as possible.

CITATION LIST

Patent Literature

[Patent Literature 1] JP 2002-321829A

SUMMARY

A logistics system according to the present invention includes a control unit, an actual arrival time acquisition section, and a storage section. The control unit calculates estimated arrival time of each transport vehicle at a logistics center. The actual arrival time acquisition section acquires actual arrival time of the each transport vehicle at the logistic center. The storage section stores actual difference information. The control unit calculates a corrected estimated arrival time of the transport vehicle at the logistics center based on the estimated arrival time of the transport vehicle at the logistics center and the actual difference information. The control unit makes an item assortment plan based on the corrected estimated arrival time.

According to the logistics system of the present invention, it is possible to improve prediction accuracy of the arrival time of the transport vehicle, and to suppress a decrease in operation efficiency of facilities and workers in the logistics center.

BRIEF DESCRIPTION OF THE DRAWINGS

The accompanying drawings are incorporated into the specification to assist in explaining some embodiments. The drawings are not to be construed as limiting the inventions to only those examples illustrated and described.

FIG. 6 is an example of data stored in the storage section;

FIG. 7 is an example of calculated correction coefficients;

FIG. 8 is an example of calculated correction coefficients;

DESCRIPTION OF EMBODIMENTS

A logistics system of some embodiments will be described with reference to the attached drawings.

Figure 1:
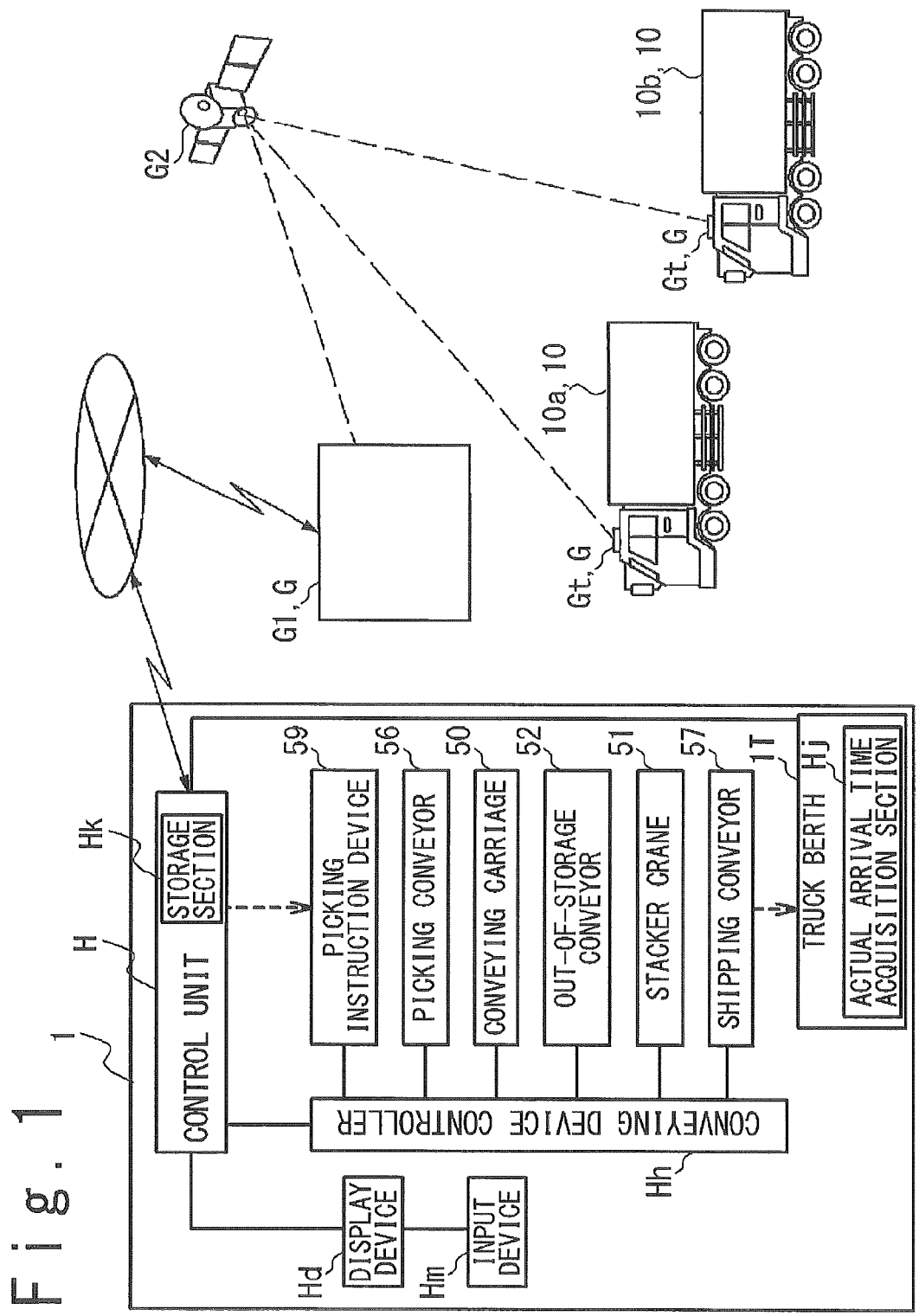
FIG. 1 is an overall schematic diagram of a logistic system according to some embodiments.

As shown in FIG. 1, the logistics system of some embodiments includes a control unit H, an actual arrival time acquisition section Hj, and a storage section Hk. The control unit H, the actual arrival time acquisition section Hj and the storage section Hk are disposed in, for example, a logistics center 1. Optionally, the logistics system may include a vehicle position management system G for managing positions of transport vehicles 10. Alternatively, the vehicle position management system G may be a system outside the logistics system and which is configured to be communicable with the logistics system. The logistics center 1 includes a warehouse for storing items. The transport vehicles 10 are vehicles traveling toward the logistics center 1 in order to receive the items to be transported to elsewhere from the logistics center 1.

Next, an outline of some embodiments will be described.
(Acquisition of Location Information of the Transport Vehicle)

The control unit H acquires location information of the transport vehicle 10 from the vehicle position management system G. In addition, the control unit H calculates variation of the location information of the transport vehicle 10 over time. For example, the variation over time corresponds to average traveling speed of the transport vehicle 10. Alternatively, the calculation of the variation over time may be performed by the vehicle position management system G, and the calculation result may be transmitted to the control unit H. Alternatively, the calculation of the variation of the location information of the transport vehicle 10 over time may be performed by a device which is equipped to the transport vehicle 10, and the calculation result may be transmitted to the control unit H.
(Calculation of Estimated Arrival Time)

The control unit H calculates estimated arrival time of a transport vehicle 10a, which is one of the transport vehicles 10, at the logistics center 1 when the transport vehicle 10a approaches within a predetermined distance (for example, 30 km) from the logistics center 1. For example, in case that current time is 13:00 o'clock, the distance between the transport vehicle 10a and the logistics center 1 is 30 kilometers and the average traveling speed of the transport vehicle 10a is 30 km/h, the estimated arrival time may be calculated to be 14:00 o'clock. Note that the average traveling speed of the transport vehicle 10a may be an average traveling speed during a predetermined period (for example, 30 minutes) just before the current time.

According to some embodiments, the calculation of the estimated arrival time is executed when the distance between the transport vehicle 10a and the logistics center 1 is shorter than the predetermined distance in case that the transport vehicle 10a approaches to the logistics center 1. The predetermined distance may be set by user input. Alternatively, the predetermined distance may be automatically set by the control unit H.

(Correction of the Estimated Arrival Time (Calculation of Corrected Estimated Arrival Time))

There exists a case that the estimated arrival time is different from actual arrival time when the transport vehicle 10a actually arrives at the logistics center 1. Therefore, according to some embodiments, the control unit H corrects the estimated arrival time.

Correction of the estimated arrival time is executed based on data acquired in the past. For example, in case that the predetermined distance was 30 kilometers, time (calculation start time) when the distance between the logistics center 1 and a transport vehicle 10b (a transport vehicle 10b may be the same as the transport vehicle 10a, or may be different from the transport vehicle 10a. Hereinafter the transport vehicle 10h is referred to as the first transport vehicle 10b and the transport vehicle 10a is referred to as the second transport vehicle 10a) became shorter than the predetermined distance (30 kilometers) was 14:00 o'clock, estimated arrival time of the first transport vehicle 10b was 14:50 and the actual arrival time of the first transport vehicle 10b was 15:00 o'clock, an estimated arrival period (which is a difference between the estimated arrival time 14:50 and the calculation start time 14:00) was 50 minutes and an actual time difference (which is a difference between the actual arrival time 15:00 and the calculation start time 14:00) was 60 minutes. In this case actual difference information, which is a difference between the estimated arrival period (50 minutes) and the actual time difference (60 minutes), is 10 minutes. Alternatively, the actual difference information may be a value obtained by dividing the actual time difference (60 minutes) by the estimated arrival period (50 minutes), namely may be 1.2=60 minutes/50 minutes. The calculation of the actual difference information may be performed by the control unit H. Alternatively, the calculation of the actual difference information may be performed by a computer other than the control unit H. The actual difference information obtained in the past is stored in the storage section Hk. Alternatively, the actual time difference and the estimated arrival period may be stored in the storage section Hk. In the latter case, the actual difference information is calculated based on the actual time difference and the estimated arrival period when the actual difference information is required, and the calculated actual difference information is temporary stored in the storage section Hk. The storage section Hk may be inside the control unit H. Alternatively, the storage section Hk may be outside the control unit H.

Next, a case that the estimated arrival time of the second transport vehicle 10a currently traveling is corrected will be described. It is supposed that the predetermined distance is 30 kilometers. In addition, it is supposed that the current time is 13:00 o'clock, the distance between the second transport vehicle 10a and the logistics center 1 is the predetermined distance (30 kilometers), the average traveling speed of the second transport vehicle 10a is 30 km/h and the estimated arrival time is 14:00 o'clock. In this case, the estimated arrival period, which is the difference between the estimated arrival time (14:00 o'clock) and the current time (13:00), is 60 minutes.

The control unit H corrects the estimated arrival time based on the estimated arrival time (14:00 o'clock) and the actual difference information (10 minutes or 1.2). For example, in case that the actual difference information is 10 minutes, the estimated arrival time is corrected by adding the actual difference information (10 minutes) to the estimated arrival time (14:00 o'clock). The corrected estimated arrival time becomes 14:10. Alternatively, in case that the actual difference information is 1.2, the estimated arrival time is corrected by adding a value (72 minutes), which is obtained by multiplying the estimated arrival period (60 minutes) by the actual difference information (1.2), to the current time (13:00 o'clock, the current time is referred to as calculation start time). The corrected estimated arrival time becomes 14:12.

The actual difference information is information which reflects actual time period from time when the first transport vehicle 10b passed through a virtual line corresponding to the predetermined distance to time when the first transport vehicle 10b arrived at the logistics center 1. Therefore, by correcting the estimated arrival time based on the actual difference information, it is possible to minimize a difference between the corrected estimated arrival time and the actual arrival time.

(Making an Item Assortment Plan)

The control unit H makes an item assortment plan which makes it possible to complete assorting items to be loaded in the second transport vehicle 10a by the corrected estimated arrival time (14:10 or 14:12).

Next, the logistics system according to some embodiments will be described in detail.

(Vehicle Position Management System)

With reference to the FIG. 1, the vehicle position management system G will be described. The vehicle position management system G includes GPS terminals Gt installed in the transport vehicles 10 (second transport vehicle 10a, first transport vehicle 10b), respectively and a position management device G1. Each of the GPS terminals Gt detects location of a corresponding transport vehicle 10 based on radio waves from a GPS satellite G2. The position management device G1 receives location information of each of the transport vehicles 10. The position management device G1 receives the location information of each transport vehicle 10 every predetermined time period (for example, 10 seconds) from the GPS terminal Gt corresponding to the each transport vehicle 10. The position management device G1 manages each of the location information of each transport vehicle 10 in the past in association with time at which the each location information was acquired. The position management device G1 manages the latest location information (current location information) of the each transport vehicle 10 in association with time at which the latest location information is acquired. Further, the position management device G1 and the control unit H of the logistics center 1 are communicable with each other via the network. Therefore, the control unit H is able to obtain the location information of each transport vehicle 10 from the position management device G1. The control unit H may obtain the location information of each transport vehicle 10 at any time. Alternatively, the control unit H may obtain the location information of each transport vehicle 10 in the past and the latest location information of the each transport vehicle 10 at time when the calculation of the estimated arrival time of the each transport vehicle 10 is performed (in other words, when the each transport vehicle 10 passes through the virtual line corresponding to the predetermined distance). Alternatively, the control unit H may include the position management device G1 (in other words, the control unit H may also have a function of the position management device G1). In case that the position management device G1 is included in the control unit H, it is possible to omit the network connecting the control unit H and the position management device G1.

(Logistics Center)

Figure 2:
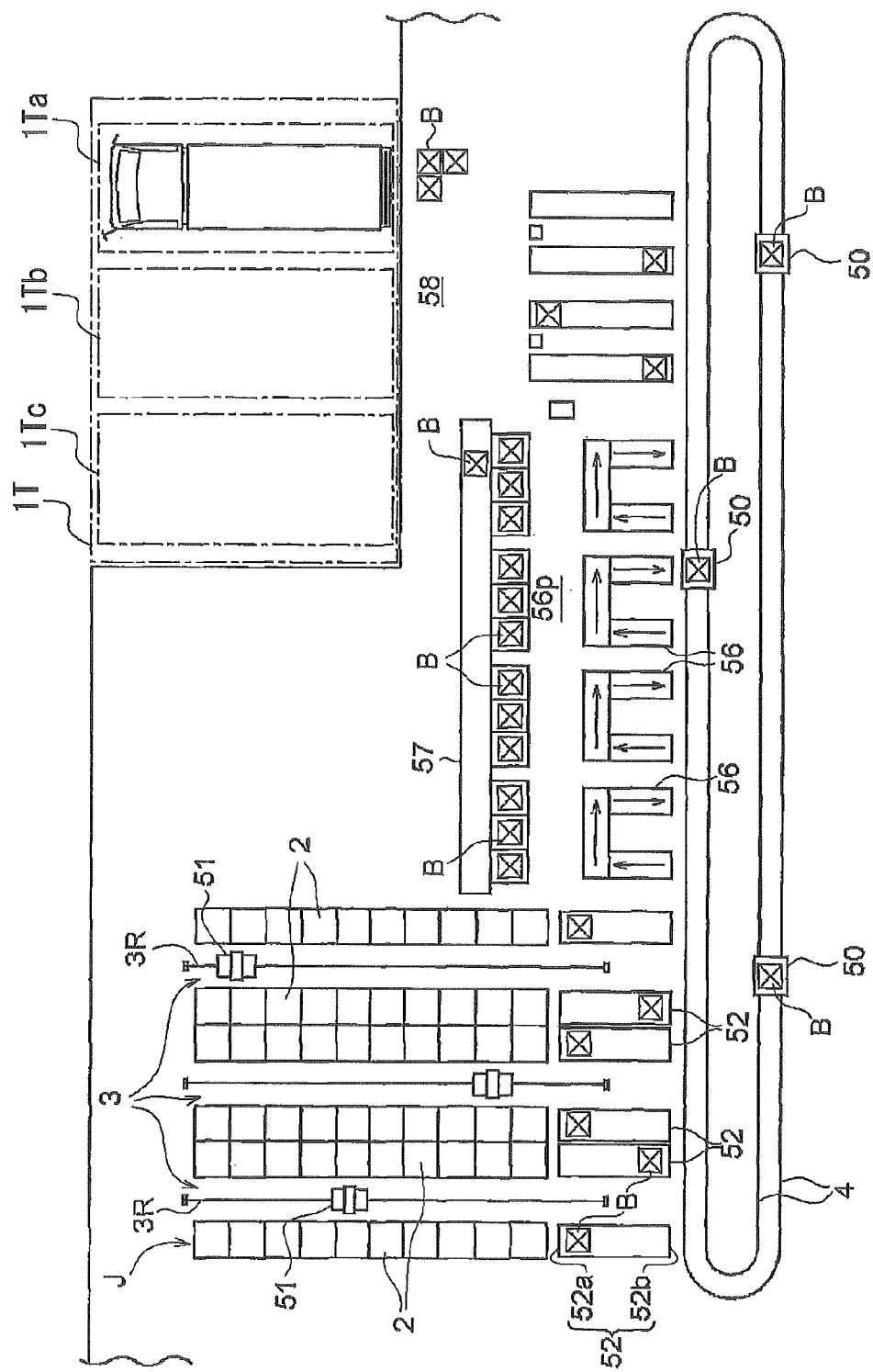
FIG. 2 is a schematic plan view of principal components of a logistics center.

As shown in FIG. 2, the logistics center includes, for example, an automated warehouse J, a conveying carriage 50, a picking conveyor 56, a picking work area 56p, a shipping conveyor 57, a truck berth 1T, etc. The automated warehouse J includes storage shelves 2 for accommodating a plurality of items B and a stacker crane 51. The stacker crane 51 is configured to travel on a travel path 3 (for example, a rail 3R) in front of the storage shelves 2. The stacker crane 51 conveys the items between any one of the shelves 2 and a first end portion 52a of the out-of-storage conveyor 52. The out-of-storage conveyor 52 conveys the items between the first end portion 52a and a second end portion 52b of the out-of-storage conveyor 52. The conveying carriage 50 is configured to travel on a travel path 4 and convey the items between the second end portion 52b of the out-of-storage conveyor 52 and the picking conveyor 56. The picking conveyor 56 conveys the items toward the picking work area 56p. The items conveyed on the picking conveyor 56 are accommodated on a pallet or in a container. On each pallet or in each container, the item or a plurality of the items is accommodated. In the picking work area 56p, one or more items, which are necessary for the assortment, are taken out from the pallet or the container. The shipping conveyor 57 conveys the taken-out items toward a temporary storage area 58 of the truck berth 1T.

The truck berth 1T of the logistics center 1 includes a plurality of parking areas (in FIG. 2, three parking areas 1Ta, 1Tb and 1Tc are described. However, the number of the parking areas may be one, two or more.). Each of the parking areas may be adapted to be used for different size truck (for example, a truck of 4 tons load capacity, a truck of 2 tons load capacity, etc.).

(Control Unit, Conveying Device Controller, Etc.)

As shown in FIG. 1, the logistics center 1 includes the control unit H, the storage section Hk, a conveying device controller Hh, a display device Hd, an input device Hm, and the actual arrival time acquisition section Hj, a picking instruction device 59, the picking conveyor 56, the conveying carriage 50, the out-of-storage conveyor 52, the stacker crane 51, and the shipping conveyor 57. The logistics system according to some embodiments includes at least the control unit H, the storage section Hk and the actual arrival time acquisition section Hj.

Each of the control unit H and the conveying device controller Hh is configured by a computer having a program storage system which includes a arithmetic section and a storage section. Each of the control unit H and the conveying device controller Hh is configured to execute various control programs. The conveying device controller Hh is configured to control each of the picking instruction device 59, the picking conveyor 56, the conveying carriage 50, the out-of-storage conveyor 52, the stacker crane 51 and the shipping conveyor 57 individually. Note that the picking instruction device 59 is a device that indicates items to be taken out to a picker who is doing a picking work at the picking work area 56p.

The control unit H is configured to make an item assortment plan by executing an item assortment plan making process described later. In addition, the control unit H is configured to execute an item assortment instruction process for instructing item assortment work to collect the plurality of items B to be loaded in the transport vehicle 10. The instruction of the item assortment work is transmitted from the control unit H to the conveying device controller Hh. The conveying device controller Hh gives operation commands, based on the instruction of the item assortment work, to the picking instruction device 59, the picking conveyor 56, the conveying carriage 50, the out-of-storage conveyor 52, the stacker crane 51 and the shipping conveyor 57, respectively. The item assortment instruction process will continue until the assortment of the plurality of items is completed, and a plurality of the commands for the item assortment work is sequentially transmitted to the conveying device controller Hh.

As described above, the control unit H is configured to execute the item assortment plan making process. Further, the control unit H is configured to execute the item assortment instruction process for instructing the item assortment work to collect the plurality of items B in the logistics center 1.

In the truck berth 1T, the actual arrival time acquisition section Hj for acquiring the actual arrival time when the transport vehicle 10 actually arrives at the track berth 1T is provided.

Figure 3:
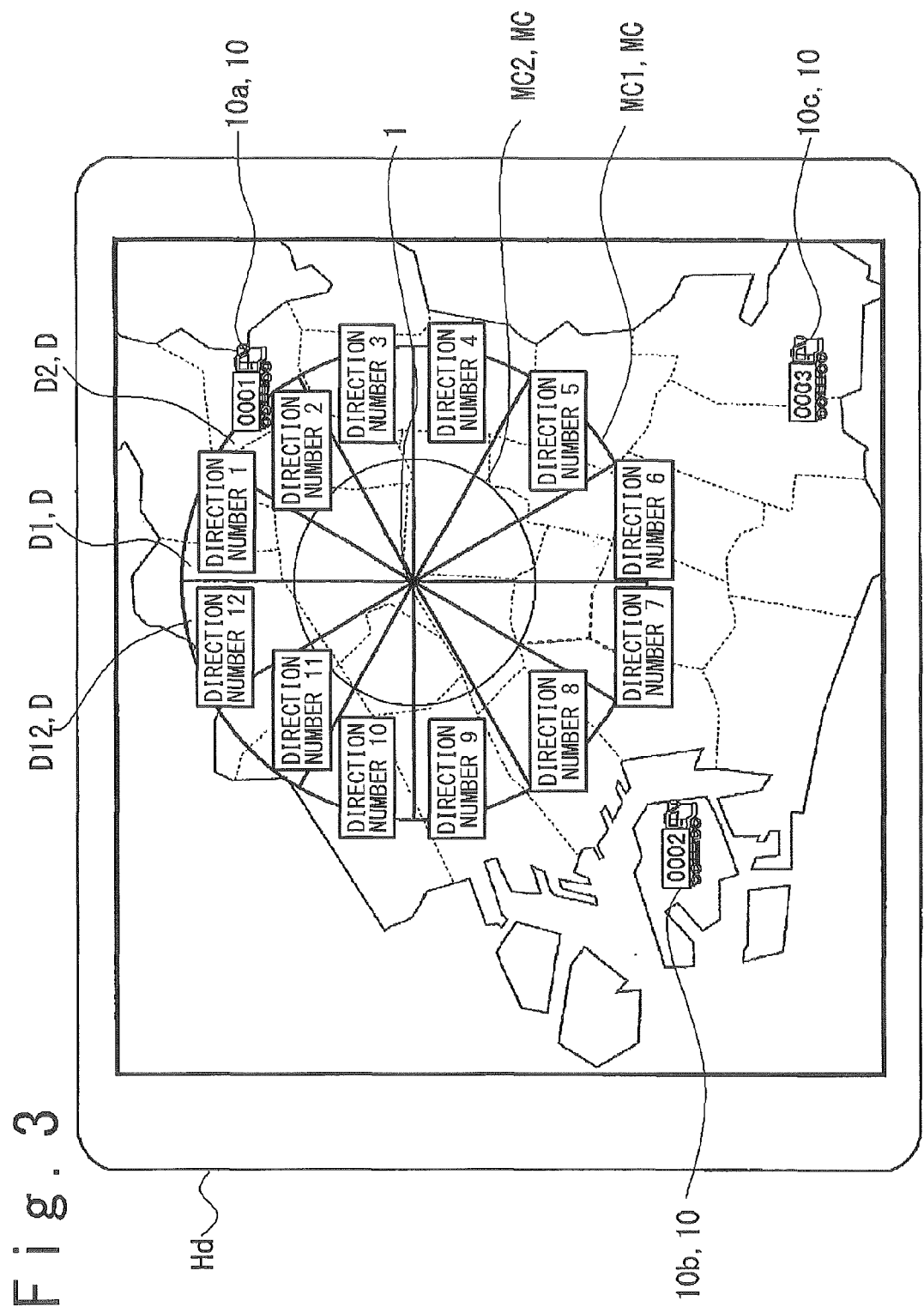
FIG. 3 is an example of a screen of a display device which is displaying positions of transport vehicles on a map.

The display device Hd such as a display and the input device Hm such as a keyboard and a mouse are connected to the control unit H. As shown in FIG. 3, the control unit H is capable of displaying a map on the display device Hd by using a map display service provided via the Internet as a Web service. Further, the control unit H can be adapted to display an icon which indicates a location of the transport vehicle 10 on the map based on the location information of the transport vehicle 10 acquired from the vehicle position management system G. The control unit H can be adapted to display the icon which is superimposed on the map displayed on the display device Hd. Note that the icons may be color-coded according to a time period in which each transport vehicle 10 corresponding to the icon in supposed to arrive at the logistics center 1. Moreover, on the map displayed on the display device Hd, a circle of a virtual line, whose center is the logistics center 1 and whose diameter corresponds to a predetermined distance MC described later, is indicated. This is a visualization of the predetermined distance MC. As to the predetermined distance, one of a plurality of predetermined distances (in FIG. 3, a circle indicated by MC1 and a circle indicated by MC2 correspond to a plurality of predetermined distances) is selectively set. The set predetermined distance MC is stored in the control unit H (namely, in the storage section Hk). The predetermined distance can also be referred to as a predetermined distance for calculation start, because the predetermined distance is in relation with the start of calculation of the estimated arrival time.

Figure 4:
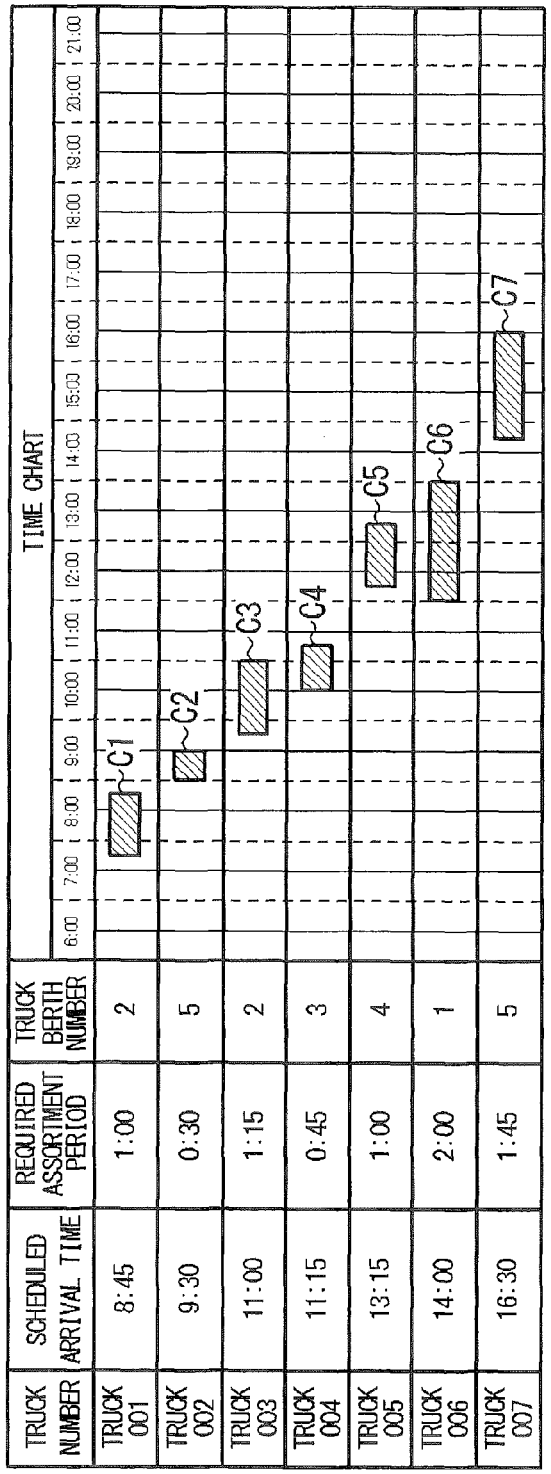
FIG. 4A is an example of a chart displayed on the display device.
FIG. 4B is an example of a part of a chart displayed on the display device.
Figure 5:
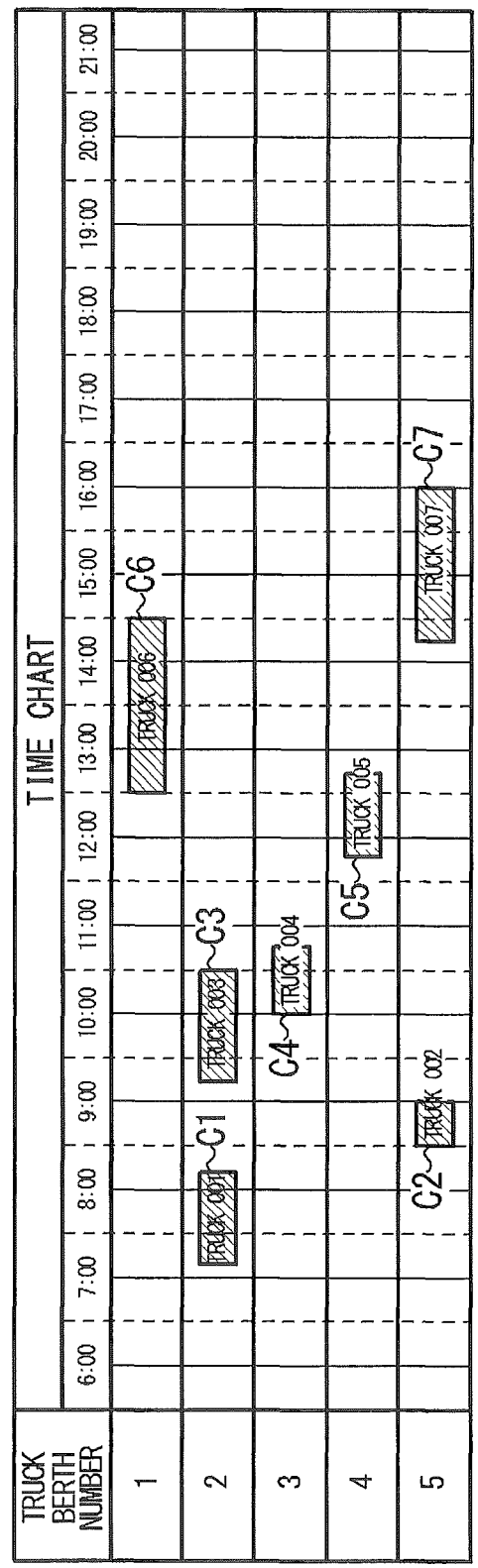
FIG. 5 is an example of a chart displayed on the display device.

The control unit H is configured to control the display device Hd to display a chart as shown in FIG. 4A or FIG. 5. Note that the map shown in FIG. 3 and the chart shown in FIG. 4A or FIG. 5 may be displayed on individual displaying areas (for example, windows), respectively. In addition, or alternatively, the user can arbitrarily select to display both of the map and the chart or to display either the map or the chart, etc.

Further, the control unit H calculates the average traveling speed V of the transport vehicle 10 based on the variation of the location (i.e. the location information) of the transport vehicle 10 over time. Note that the location information is obtained from the vehicle position management system G. The average traveling speed V is updated every predetermined time period (for example, 30 seconds). The updated average traveling speed V (the latest average traveling speed V) is stored in the storage section Hk.

Moreover, the control unit H judges, based on the location information of the transport vehicle 10 acquired from the vehicle position management system G, whether or not the distance between the transport vehicle 10 and the logistics center 1 becomes shorter than the predetermined distance MC, namely the transport vehicle 10 passes through the virtual line corresponding to the predetermined distance MC. When the control unit H judges that the distance between the transport vehicle 10 and the logistics center 1 becomes shorter than the predetermined distance MC, the control unit H calculates the estimated arrival time in which the transport vehicle 10 is supposed to arrive at the logistics center 1. The estimated arrival time is calculated based on the calculation start time when the control unit H judges that the distance between the transport vehicle 10 and the logistics center 1 becomes shorter than the predetermined distance MC (in other words, when the transport vehicle 10 passes through the virtual line corresponding to the predetermined distance MC), and the assumption that the transport vehicle 10 travels toward the logistics center 1 by keeping the average traveling speed V. More specifically, the control unit H calculates the estimated arrival time by adding a value (a time), which is obtained by dividing the predetermined distance MC by the average traveling speed V, to the calculation start time.

Namely, the control unit H calculates the estimated arrival time based on the distance between the transport vehicle 10 and the logistics center 1 (in other words, the predetermined distance MC), the variation of the location information of the transport vehicle 10 over time (for example, the average traveling speed) and the calculation start time. A process for calculating the estimated arrival time corresponds to an arrival time estimation process.

FIG. 4A is an example of a chart displayed on the display device Hd. In the chart, correspondence among a truck number assigned to a transport vehicle 10, scheduled arrival time, a required assortment period for assorting items and a truck berth number corresponding to a truck berth used for loading the items in the transport vehicle 10 is indicated.

Bars C1, C2, . . . , C7 in FIG. 4A indicate a schedule for the item assortment work at a current day. The schedule is corrected at the time (the calculation start time) when the transport vehicle 10 passes through the virtual line corresponding to the predetermined distance, if the corrected estimated arrival time of the transport vehicle 10 calculated by the control unit H and the scheduled arrival time does not match with each other. For example, the scheduled arrival time (13:15) of the truck 005 in FIG. 4A is corrected to the corrected scheduled arrival time (13:00) (i.e. the corrected estimated arrival time (13:00)) of the truck 005 in FIG. 4B. Moreover, the position of the bar C5 corresponding to the truck 005 on the time chart in FIG. 4A is corrected to the position of the bar C5 corresponding to the truck 005 on the time chart in FIG. 4B.

The schedule correction described above corresponds to the making of the item assortment plan of some embodiments, in other words, corresponds to the item assortment plan making process. Namely, based on the calculated corrected estimated arrival time, the control unit H executes the item assortment plan making process for making the item assortment plan to prepare the items B to be loaded in the transport vehicle 10 in the logistics center.

As to bars C1, C2, . . . , C7, if the assortment work start time (time corresponding to the left side end of the bar) is later than the current time, the position of the corresponding bar on the time chart can be modified by the user through the input device Hm.

FIG. 5 is an example of a chart displayed on the display device Hm. The chart in FIG. 5 is obtained by converting the chart in FIG. 4A in order to represent the time chart in association with each of the truck berth number. The charts in FIG. 4A and FIG. 5 are hereinafter referred to as item assortment plan charts.

(Storage Section)

Data base program is running on the storage section Hk. In the database created by the database program, the actual difference information calculated based on the difference between the estimated arrival time of the transport vehicle 10 calculated by the arrival time estimation process and the actual arrival time of the transport vehicle 10 acquired from the actual arrival time acquisition section Hj is stored.

FIG. 6 is an example of data including the difference information stored in the storage section Hk (database).

In the database, a period from the calculation start time to the estimated arrival time (in other words, "estimated arrival period S") [minute], "actual time difference" calculated based on the difference between the estimated arrival time and the actual arrival time of the transport vehicle 10 [minute], and "coefficient K" calculated by dividing (the estimated arrival period+the actual time difference) by the estimated arrival period are stored in association with "work code" assigned to corresponding transport work. For example, it is possible to use an average value of the actual time differences as the actual difference information to correct the estimated arrival time. Alternatively, it is possible to use an average value of the coefficients K as a correction coefficient Kh (namely, the actual difference information) to correct the estimated arrival time. Alternatively, it is possible to use any one of the coefficients K or an average value of selected coefficients K as a correction coefficient Kh (namely, the actual difference information) to correct the estimated arrival time.

In addition, in the database, a plurality of circumstance elements is stored in association with the work code (in some cases, in association with the actual difference information). Each circumstance element represents a status of a circumstance factor. The circumstance factor is, for example "month" when transport of items corresponding to the work code is executed, "day of the week", "time zone" (time zone such as from 9:00 to 12:00, from 12:00 to 15:00, from 15:00 to 18:00, etc.), "holiday" which means whether or not that day is holiday, "Gotobi" which means whether or not that day corresponds to "Gotobi", which is $5^{th}$ day, $10^{th}$ day, $15^{th}$ day, $20^{th}$ day, $25^{th}$ day or either of $30^{th}$ day or the last day of the month, "weather" which means weather of that day, or "direction number" (i.e. direction information). For example, in case that the circumstance factor is the "day of the week", the circumstance element (i.e. the status of the circumstance factor) is any one of Monday, Tuesday, Wednesday, Thursday, Friday, Saturday or Sunday. Further, the "direction number" indicates a direction from the logistics center 1 to the transport vehicle 10 when the transport vehicle 10, in which the items prepared during the item assortment work corresponding to the work code are loaded, passes through the virtual line corresponding to the predetermined distance MC. In FIG. 3, directions are divided into twelve directions, and D1, D2, . . . , D12 correspond to direction number 1, direction number 2, . . . , direction number 12, respectively.

A value of the estimated arrival period S, a value of the actual time difference, a value of the coefficient K and a plurality of circumstance elements, which corresponds to each work code, are hereinafter referred to as work information. Namely, in table of FIG. 6, the information in each row corresponds to the work information.

As described above, the storage section Hk stores the actual difference information calculated based on the difference between the estimated arrival time of the transport vehicle 10 calculated by the arrival time estimation process and the actual arrival time of the transport vehicle 10 acquired from the actual arrival time acquisition section Hj. One form of the actual difference information is the actual time difference or a derivative from the actual time differences. Another form of the actual difference information is the coefficient K or a derivative from the coefficients K (for example, an average value of the coefficients).

The user may select a circumstance factor to be used for correcting the estimated arrival time among above mentioned circumstance factors via the input device Hm. Alternatively, the control unit H may automatically select a circumstance factor to be used for correcting the estimated arrival time.

As to the selected circumstance factor, the control unit calculates an average value of a plurality of coefficients K for each circumstance element indicating a corresponding status of the selected circumstance factor. Each average value of the plurality of coefficients K corresponding to one of the statuses of the selected circumstance factor is used as the correction coefficient Kh (i.e. the actual difference information) in correcting the estimated arrival time.

For example, if "weather" is selected as the circumstance factor, a correction coefficient Kh in case that the circumstance element (i.e. status of the circumstance factor) is fine weather, a correction coefficient Kh in case that the circumstance element (i.e. status of the circumstance factor) is cloudy weather and a correction coefficient Kh in case that the circumstance element (i.e. status of the circumstance factor) is rainy weather are calculated, respectively. For example, a correction coefficient Kh in case that the circumstance element (i.e. status of the circumstance factor) is fine weather is obtained by (1) extracting work information including fine weather as the circumstance element (in other words, extracting every row in the table of FIG. 6 which includes fine weather) and (2) calculating an average value of the coefficients K included in the extracted work information (in other words, an average value of the coefficients K included in the extracted rows). Explanation will be made with reference to the table of FIG. 6. In FIG. 6, work information including fine weather as the circumstance element (status of the circumstance factor) is work information whose work codes are 2013091001, 2013091002, 2013091201, 2013091202, . . . . Therefore, the correction coefficient Kh is obtained by calculating an average value of the coefficients 1.17, 0.90, 0.83, 1.10 . . . corresponding to the work information. The obtained correction coefficient Kh is used as the actual difference information. Further, the obtained correction coefficient Kh can be called as a circumstance-associated correction coefficient (in other words, circumstance-associated actual difference information) because the obtained correction coefficient Kh is a correction coefficient obtained under the consideration of the circumstance. Similarly, the correction coefficient Kh in case that the circumstance element (i.e. status of the circumstance factor) is cloudy weather and the correction coefficient Kh in case that the circumstance element (i.e. status of the circumstance factor) is rainy weather can be called as circumstance-associated correction coefficients (in other words, circumstance-associated actual difference information), respectively.

For example, if "direction number" is selected as the circumstance factor, a correction coefficient Kh in case that the circumstance element (i.e. status of the circumstance factor) is direction number 1, a correction coefficient Kh in case that the circumstance element (i.e. status of the circumstance factor) is direction number 2, and a correction coefficient Kh in case that the circumstance element (i.e. status of the circumstance factor) is direction number N are calculated, respectively.

The correction coefficient Kh in case that the circumstance element (i.e. status of the circumstance factor) is the direction number 1, the correction coefficient Kh in case that the circumstance element (i.e. status of the circumstance factor) is the direction number 2, . . . , and the correction coefficient Kh in case that the circumstance element (i.e. status of the circumstance factor) is the direction number N can be called as circumstance-associated correction coefficients, respectively (in other words, circumstance-associated actual difference information) because the correction coefficients Kh are correction coefficients obtained under the consideration of the circumstances. Further, the correction coefficient Kh in case that the circumstance element (i.e. status of the circumstance factor) is the direction number 1, the correction coefficient Kh in case that the circumstance element (i.e. status of the circumstance factor) is the direction number 2, . . . , and the correction coefficient Kh in case that the circumstance element (i.e. status of the circumstance factor) is the direction number N can be called as direction-associated correction coefficients, respectively (in other words, direction-associated actual difference information) because the correction coefficients Kh are correction coefficients obtained under the consideration of the directions.

For example, if "direction number" and "day of the week" are selected as the circumstance factors, each correction coefficient Kh corresponding to both one of the direction numbers and one of the days of the week is calculated as shown in FIG. 7. For example, if "direction number" and "weather" are selected as the circumstance factors, each correction coefficient Kh corresponding to both one of the direction numbers and one of the fine, cloudy, light rain, heavy rain, snow or strong wind is calculated as shown in FIG. 8. Each correction coefficient Kh in the table of FIG. 7 corresponds to the direction-associated correction coefficient as well as the circumstance-associated correction coefficient. Each correction coefficient Kh in the table of FIG. 8 corresponds to the direction-associated correction coefficient as well as the circumstance-associated correction coefficient.

For example, a correction coefficient in case that one of the circumstance elements is the fine weather and another circumstance element is the direction number 1, which corresponds to the correction coefficient 1.0 at the top left of the table in FIG. 8, is obtained by (1) extracting work information which includes both fine weather and direction number 1 (in FIG. 6, for example, the work information corresponding to the work code 2013091001, . . . ) and (2)

calculating an average value of the coefficients K included in the extracted work information.

Alternatively, a correction coefficient in case that one of the circumstance element is the fine weather and another circumstance element is the direction number 1, which corresponds to the correction coefficient 1.0 at the top left of the table in FIG. 8, is obtained as follows. Firstly, in FIG. 6, work information including fine weather (for example, the work information corresponding to the work codes 2013091001, 2013091002, 2013091201, 2013091202, . . . ) is extracted and an average value (a first average value) of the coefficients K included in the extracted work information is calculated. Secondly, in FIG. 6, work information including direction number 1 (for example, the work information corresponding to the work code 2013091001, . . . ) is extracted and an average value (a second average value) of the coefficients K included in the extracted work information is calculated. Thirdly, an average value of the first average value and the second average value is calculated, and the calculated average value is used as the correction coefficient Kh in case that one of the circumstance elements is the fine weather and another circumstance element is the direction number 1. This method is a method in which each average value (the first average value, the second average value, . . . ) of coefficients corresponding to one of the circumstance elements (i.e. one of the statuses of the circumstance factor) is calculated, an average value of a plurality of the average values of coefficients (an average value of the first average value, the second average value, . . . ) is calculated, and the calculated average value is used as the correction coefficient Kh.

In some embodiments, the circumstance element can be directly selected instead of selecting the circumstance factor. For example, if the cloudy weather is selected as the circumstance element (i.e. the status of the circumstance factor), the correction coefficient Kh is obtained by (1) extracting work information which includes cloudy weather (for example, the work information corresponding to the work code 2013091101, 2013091602, . . . ) and (2) calculating an average value of the coefficients K included in the extracted work information.

The control unit H corrects the estimated arrival time, which is calculated by the control unit H, based on the correction coefficient Kh (i.e. actual difference information). A value which is obtained by correcting the estimated arrival time based on the correction coefficient Kh corresponds to the corrected estimated arrival time. More specifically, the corrected estimated arrival time is obtained by (1) multiplying the estimated arrival period S by the correction coefficient Kh (i.e. actual difference information), (2) adding an obtained value by multiplying based on the above (1) to the calculation start time (the time when the distance between the transport vehicle 10 and the logistics center 1 becomes equal to the predetermined distance MC). This process for calculating the corrected estimated arrival time corresponds to an estimated arrival time correction process.

The storage section Hk may be configured to store the circumstance-associated actual difference information. In addition, or alternatively, the storage section Hk may be configured to store the direction-associated actual difference information. For example, the storage section Hk may be configured to store a table corresponding to the table of FIG. 7, or store data of 84=12*7 pieces described in the table of FIG. 7. In other words, the storage section Hk may be configured to store a plurality of circumstance-associated actual difference information calculated under the consideration of each circumstance factor (or each circumstance element). In case that the storage section Hk is storing the circumstance-associated actual difference information (or direction-associated actual difference information), the control unit H can correct the estimated arrival time based on the circumstance-associated actual difference information (or direction-associated actual difference information), which is stored in the storage section Hk.

Even if the transport vehicle travels on the same route as before, there is a possibility that the traveling speed of the transport vehicle is different from the previous in accordance with the status of the circumstance factor (for example, in case that the circumstance factor is weather, the status may be fine weather, cloudy weather or the rainy weather). Therefore, according to some embodiments, the estimated arrival time is corrected based on the circumstance-associated actual difference information. Namely, according to some embodiments, the estimated arrival time is corrected in accordance with the actual circumstance of the route on which the transport vehicle 10 travels. As a result, it is possible to improve prediction accuracy of the arrival time.

In addition, frequency of congestion occurrence or legal speed limit, etc. of the route is different from each other in accordance with conditions (for example, whether local road or highway) of the route on which the transport vehicle travels, or conditions of area (for example, whether area having wide roads or area having only narrow roads) through which the transport vehicle passes. Therefore, there is a possibility that a period from the time when the transport vehicle 10 passes through the virtual line corresponding to the predetermined distance to the time when the transport vehicle 10 arrives at the logistics center 1 is different for each of a plurality of different directions. Therefore, according to some embodiments, the storage section stores a plurality of the direction-associated actual difference information corresponding to each direction around the logistics center. According to some embodiments, the estimated arrival time of the transport vehicle is corrected based on the direction-associated actual difference information corresponding to the direction from the logistics center to the transport vehicle. As a result, it is possible to improve prediction accuracy of the arrival time.

The actual difference information, the circumstance-associated actual difference information or the direction-associated actual difference information described above may be updated every time when both of the estimated arrival time of the transport vehicle 10 and its actual arrival time are acquired. Alternatively, the actual difference information, the circumstance-associated actual difference information or the direction-associated actual difference information described above may be updated every time when both of the estimated arrival time of the transport vehicle 10 and its actual arrival time of the predetermined number are acquired. By updating the actual difference information, the circumstance-associated actual difference information or the direction-associated actual difference information, prediction accuracy of the arrival time based on the corrected estimated arrival time is further improved.

(Control Flow)

Figure 9A:
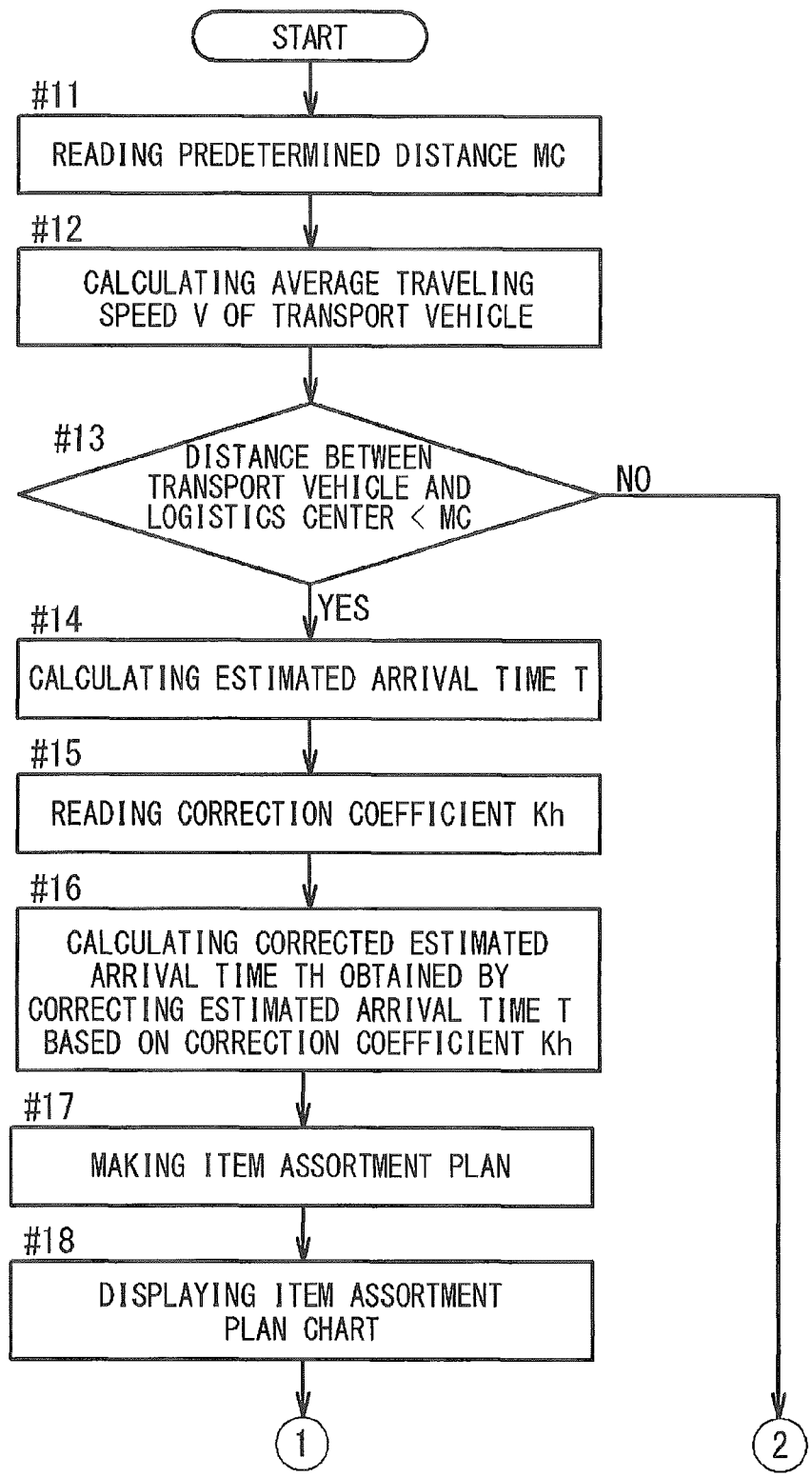
FIG. 9A is a flowchart provided to explain control operation to be executed by the control unit.
Figure 9B:
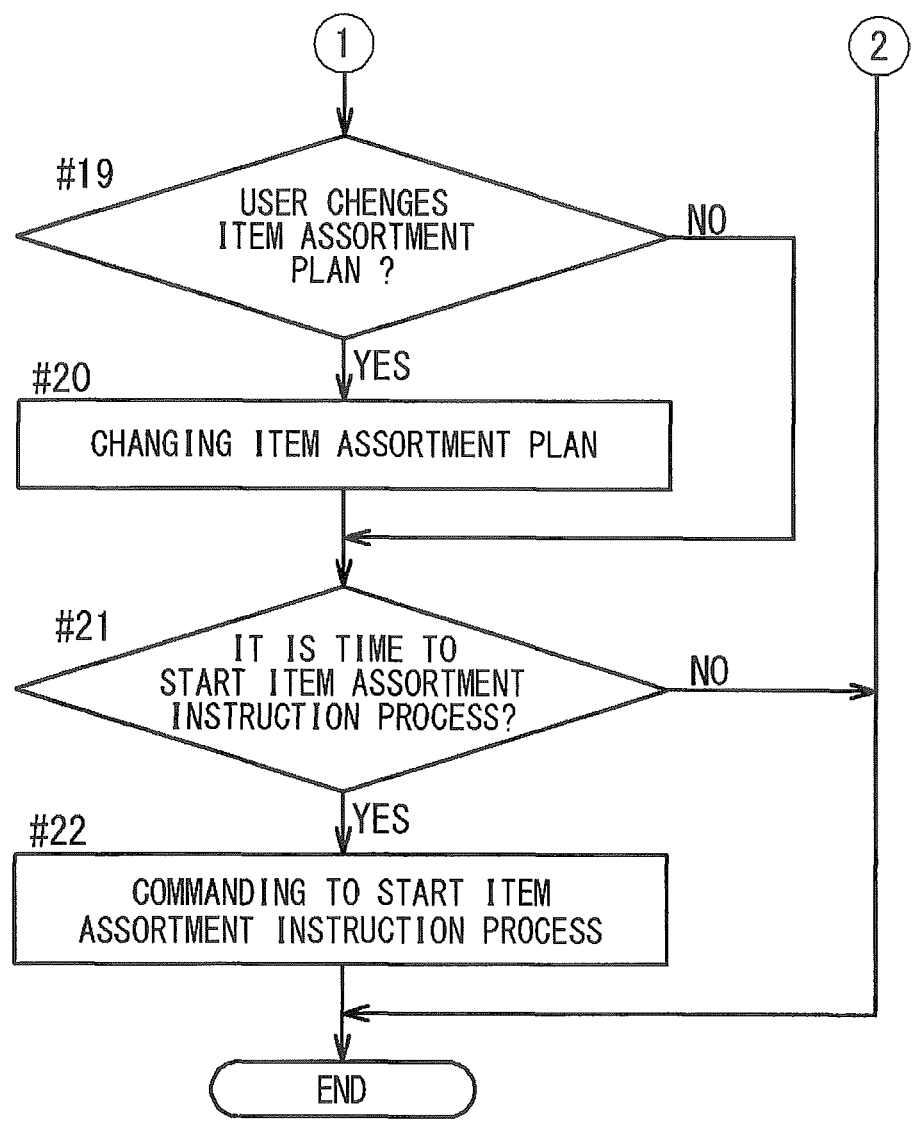
FIG. 9B is a flowchart provided to explain control operation to be executed by the control unit.

Next, with reference to the flowchart of FIGS. 9A and 9B, the control performed by the control unit H will be described.

Firstly, in step #11, the control unit H reads the predetermined distance MC, which was selected in advance by the user among the plurality of the predetermined distances (for example predetermined distances MC1, MC2 in FIG. 3). In step #12, the control unit H calculates the average traveling speed V of the transport vehicle 10.

In step #13, the control unit H judges whether or not the distance between the transport vehicle 10 and the logistics center 1 becomes shorter than the predetermined distance MC.

In step #13, in case that the control unit H judges that the distance between the transport vehicle and the logistics center 1 becomes shorter than the predetermined distance MC, then go to step #14. In step #14, the control unit H calculates the estimated arrival time T of the transport vehicle 10 by adding the value obtained by dividing the predetermined distance MC by the average traveling speed V to the calculation start time. Note that the calculation start time is the time when the distance between the transport vehicle 10 and the logistics center 1 becomes shorter than the predetermined distance MC. In step #15, the control unit H reads the correction coefficient Kh (i.e. the actual difference information), which is stored in the storage section Hk. In step #16, the control unit H calculates the corrected estimated arrival time TH which is obtained by correcting the estimated arrival time T based on the correction coefficient Kh.

In step #17, the control unit makes the item assortment plan for the transport vehicle 10 based on the corrected estimated arrival time TH. In step #18, the control unit H makes the display device Hd display the item assortment plan chart as shown in FIG. 4A or FIG. 5.

In step #19, the control unit H judges whether or not the user changes the item assortment plan by sliding the bar displayed on the item assortment plan chart. In step #19, in case that the control unit H judges that the user changes the item assortment plan (in case of "YES"), then go to step #20. In step #19, in case that the control unit H judges that the user does not change the item assortment plan (in case of "NO"), then go to step #21. In step #20, the control unit changes the item assortment plan in accordance with the change operation by the user. Note that the control unit H prohibits changing a part of information which represents the schedule earlier than the current time.

In step #21, the control unit H judges whether or not it is time to start the item assortment instruction process. In step #21, in case that the control unit H judges that it is time to start the item assortment instruction process, then go to step #22. In step 22, the control unit commands to start the item assortment instruction process.

In step 13, in case that the control unit H judges that the distance between the transport vehicle 10 and the logistics center 1 is still longer than the predetermined distance MC, then the flow comes to end. In step #21, in case that the control unit H judges that it is not time to start the item assortment instruction process, then the flow comes to end. In case that the step #22 is completed, then the flow comes to end. The control unit H performs the processes shown in the flowchart of FIGS. 9A and 9B every predetermined period (for example, every 30 seconds) for every transport vehicle 10 scheduled to arrive at the logistics center 1 on the current day.

As described above, according to the logistics system of some embodiments, prediction accuracy of the arrival time is improved by correcting the estimated arrival time T of the transport vehicle 10 at the logistics center 1 based on the actual historical data. Therefore, it is possible to realize the logistics center with which a decrease in operation efficiency of facilities such as truck berth and workers is suppressed.

Other Embodiments (1) In the above-mentioned embodiments, the vehicle position management system of GPS type is described as an example. However, embodiments are not limited to the above configuration. For example, it is possible to use other types of vehicle position management systems such as a vehicle position management system of PHS type.

(2) In the above-mentioned embodiments, the storage section Hk is included in a hardware which comprises the control unit H. However, it is possible that the storage section Hk is included in hardware other than the hardware comprising the control unit H.

(3) In the above-mentioned embodiments, the conveying device controller Hh is configured to control operations of the picking instruction device 59, the picking conveyor 56, the conveying carriage 50, the out-of-storage conveyor 52, the stacker crane 51, and the shipping conveyor 57. However, it is possible to adopt a configuration that each device controller controls a corresponding device.

(4) In the above-mentioned embodiments, the configuration that the estimated arrival time T is corrected by calculating the value which is obtained by multiplying the estimated arrival period S by the correction coefficient Kh and then adding the calculated value to the calculation start time is described. However, embodiments are not limited to the above configuration. For example, a configuration that the estimated arrival time T is corrected by extracting the median value of estimated arrival periods S and adding the median value to the calculation start time may be adopted.

(5) In the above-mentioned embodiments, the storage section Hk is configured to store each direction-associated actual difference information corresponding to one of the twelve directions D (D1, D2, . . . , D12) around the logistics center 1. However, the number of directions D may be more than twelve or less than twelve. Alternatively, it is possible not to divide in directions. In addition, in FIG. 3, an example that each of the divided direction has a fan-shape of the same center angle around the logistics center 1 is described. However, it is possible that one center angle of one fan corresponding to one direction is different from another center angle of another fan corresponding to another direction. Moreover, it is possible that instead of adopting the direction number as the circumstance factor, each number is assigned to one of roads on the virtual line corresponding to the predetermined distance and the assigned number (in other words, road number) is adopted as the circumstance factor (i.e. direction information).

(6) In the above-mentioned embodiments, the configuration that any one of the plurality of distances (MC1, MC2) is set as the predetermined distance MC and the predetermined distance MC selected in advance by the user is stored in the control unit H (the storage section Hk) is described. By setting the predetermined distance to relatively long distance, it is possible to avoid the situation that the period until the corrected estimated arrival time is shorter than the period required to the item assortment work. On the other hand, by setting the predetermined distance to relatively short distance, prediction accuracy of the arrival time is improved. According to some embodiments, it is possible to secure adequate assortment work period as well as secure prediction accuracy of the arrival time by selecting adequate predetermined distance MC.

Note that it is possible that the control unit H automatically set the predetermined distance MC instead of setting the predetermined distance MC manually by the user. For example, the control unit H may automatically set the predetermined distance MC such that the estimated arrival period S of the transport vehicle 10 is longer than a period required to assort items B to be loaded in the transport vehicle 10. In this case, it is possible to avoid as much as possible a situation such that the period from the calculation start time to the corrected estimated arrival time is shorter than the period required for item assortment work.

(7) In the above-mentioned embodiments, the configuration that the circumstance factor includes "month" when the transport corresponding to the work code is executed, "day of the week", "time zone" (the time zone such as from 9:00 to 12:00, from 12:00 to 15:00, from 15:00 to 18:00, etc.), "holiday" which means whether or not that day is holiday, "Gotobi" which means whether or not that day corresponds to $5^{th}$ day, $10^{th}$ day, $15^{th}$ day, $20^{th}$ day, $25^{th}$ day or either of $30^{th}$ day or the last day of the month, "weather" which means weather of that day, or "direction number" is described. However, type of the circumstance factor is not limited to the above examples and is selected arbitrarily. For example, Rokuyou which represents the days of the Japanese calendar (there are six labels that indicate how auspicious a given day in the calendar is and people will make decisions based on that) or whether or not events such as festival exist on that day can be added as the circumstance factor. Of course, it is possible to omit some of above mentioned circumstance factors.

(8) In the above-mentioned embodiments, the configuration that the item assortment work is performed by using devices such as the picking conveyor 56, the conveying carriage 50, the out-of-storage conveyor 52, the stacker crane 51, and the shipping conveyor 57 and by the picking work by the picker or other workers. However, it is possible that every process of the assortment work is performed by the picker. In this case, the control unit H commands to output job cards or display order information on a work order terminal as a part of the item assortment instruction process.

(9) In the above-mentioned embodiments, the configuration that the actual arrival time is acquired by the actual arrival time acquisition section Hj provided in the truck berth 1T is described. However, embodiments are not limited to the above configuration. For example, it is possible to adopt a configuration that a driver of the transport vehicle 10 or the guard person worked around an entrance gate manually inputs the actual arrival time when the transport vehicle 10 arrives at the gate of the logistics center 1.

As mentioned above, the present invention has been described by referring to embodiments. However, the present invention is not limited to the above-mentioned embodiments. Various modifications can be performed on the above-mentioned embodiments. For example, any combination within a range compatible to each other with regard to the above-mentioned embodiments may be regarded as the embodiment of the present invention.

What is claimed is:

1. A logistics system, comprising a processor coupled to a non-transitory memory storing instructions for executing:
   a control unit configured to calculate an estimated arrival time of transport vehicles toward a logistics center;
   an actual arrival time acquisition section configured to acquire a time when each transport vehicle has arrived at the logistics center as an actual arrival time of each transport vehicle;
   a storage section configured to store actual difference information calculated based on a difference between said estimated arrival time calculated in a past by said control unit and said actual arrival time acquired in the past by said actual arrival time acquisition section;
   a conveying device controller; and
   a conveying device,
   wherein said control unit is further configured to calculate an estimated arrival time of a transport vehicle currently traveling toward the logistics center based on a variation of location information of said transport vehicle currently traveling over time, a time when a distance between the logistics center and said transport vehicle currently traveling becomes shorter than a predetermined distance, and said predetermined distance,
   wherein said control unit is further configured to calculate a corrected estimated arrival time of said transport vehicle currently traveling toward the logistics center based on said estimated arrival time of said transport vehicle currently traveling toward the logistics center and said actual difference information,
   wherein said control unit is further configured to make an item assortment plan based on said corrected estimated arrival time,
   wherein said control unit is further configured to transmit, to said conveying device controller, instructions for instructing item assortment work to collect a plurality of items to be loaded in the transport vehicle currently traveling toward the logistics center based on the item assortment plan,
   wherein said conveying device controller is configured to transmit, to the conveying device, operation commands for conveying the plurality of items based on the instructions,
   wherein the conveying device further comprises an out-of-storage conveyor that receives the operation commands from said conveying device controller for said conveying the plurality of items, and
   wherein the conveying device further comprises a stacker crane that conveys the plurality of items between a plurality of shelves and the out-of-storage conveyor, the stacker crane receiving the operation commands from said conveying device controller for said conveying the plurality of items.

2. The logistics system according to claim 1, wherein said actual difference information includes circumstance-associated actual difference information associated with a status of at least one of circumstance factors, and
   wherein said control unit is further configured to calculate said corrected estimated arrival time based on said estimated arrival time of said transport vehicle currently traveling toward the logistics center and said circumstance-associated actual difference information.

3. The logistics system according to claim 2, wherein said circumstance factors include weather, and
   wherein said status includes one of a fine weather, a cloudy weather, and a rainy weather.

4. The logistics system according to claim 1, wherein said actual difference information includes direction-associated actual difference information associated with a status of at least one of circumstance factors, said circumstance factors including direction information,
   wherein said status includes one of a plurality of directions, and
   wherein said control unit is further configured to calculate said corrected estimated arrival time based on said estimated arrival time of said transport vehicle currently traveling toward the logistics center and said direction-associated actual difference information.

5. The logistics system according to claim 1, wherein said control unit is further configured to selectively set said predetermined distance.

6. The logistics system according to claim 5, wherein said control unit is further configured to set said predetermined distance based on a period required to assort items.

7. A logistics system, comprising a processor coupled to a non-transitory memory storing instructions for executing:
- a control unit configured to execute an arrival time estimation process for calculating estimated arrival time of transport vehicles toward a logistics center, an estimated arrival time correction process for calculating a corrected estimated arrival time of each transport vehicle toward the logistics center, and an item assortment plan making process for making an item assortment plan;
- an actual arrival time acquisition section configured to acquire a time when each transport vehicle has arrived at the logistics center as an actual arrival time of each transport vehicle;
- a storage section;
- a conveying device controller; and
- a conveying device,
- wherein said arrival time estimation process includes a process for calculating said estimated arrival time based on a variation of location information of each transport vehicle over time, a time when a distance between the logistics center and each transport vehicle becomes shorter than a predetermined distance, and said predetermined distance,
- wherein said estimated arrival time correction process includes a process for calculating said corrected estimated arrival time based on said estimated arrival time and actual difference information,
- wherein said item assortment plan making process includes a process for making said item assortment plan based on said corrected estimated arrival time,
- wherein said control unit is further configured to calculate an estimated arrival time of a first transport vehicle by executing said arrival time estimation process,
- wherein said storage section is further configured to store said actual difference information calculated based on a difference between said estimated arrival time of said first transport vehicle and an actual arrival time of said first transport vehicle acquired by said actual arrival time acquisition section,
- wherein said control unit is further configured to calculate an estimated arrival time of a second transport vehicle by executing said arrival time estimation process,
- wherein said control unit is further configured to calculate a corrected estimated arrival time of said second transport vehicle by executing said estimated arrival time correction process,
- wherein said control unit is further configured to make an assortment plan corresponding to said second transport vehicle by executing said item assortment plan making process,
- wherein said control unit is further configured to transmit, to said conveying device controller, instructions for instructing item assortment work to collect a plurality of items to be loaded in the transport vehicle currently traveling toward the logistics center based on the item assortment plan,
- wherein said conveying device controller is configured to transmit, to the conveying device, operation commands for conveying the plurality of items based on the instructions, and
- wherein the conveying device comprises a picking conveyor that conveys the plurality of items toward a picking work area, the picking conveyor receiving the operation commands from said conveying device controller for said conveying the plurality of items.

8. The logistics system according to claim 1, wherein said control unit continues to transmit the instructions to said conveying device controller until the item assortment work is complete.

9. The logistics system according to claim 1, wherein said control unit continues to transmit the instructions to said conveying device controller until the instructing item assortment work is sequentially transmitted to the conveying device controller.

10. The logistics system according to claim 1, wherein the conveying device comprises a picking instruction device that indicates the plurality of items to be taken out to a picker at a picking work area, the picking instruction device receiving instructions from said control unit and the operation commands from said conveying device controller for said conveying the plurality of items.

11. The logistics system according to claim 10, wherein the conveying device further comprises a picking conveyor that conveys the plurality of items toward the picking work area, the picking conveyor receiving the operation commands from said conveying device controller for said conveying the plurality of items.

12. The logistics system according to claim 11, wherein the conveying device further comprises a conveying carriage that travels on a travel path and conveys the plurality of items between the out-of-storage conveyor and the picking conveyor, the conveying carriage receiving the operation commands from said conveying device controller for said conveying the plurality of items.

13. The logistics system according to claim 12, wherein the conveying device further comprises a shipping conveyor that conveys taken-out items of the plurality of items toward a temporary storage area of a transport vehicle berth that is provided with the actual arrival time acquisition section, the shipping conveyor receiving the operation commands from said conveying device controller for said conveying the plurality of items.

14. The logistics system according to claim 7, wherein said control unit continues to transmit the instructions to said conveying device controller until the item assortment work is complete.

15. The logistics system according to claim 7, wherein said control unit continues to transmit the instructions to said conveying device controller until the instructing item assortment work is sequentially transmitted to the conveying device controller.

16. The logistics system according to claim 7, wherein the conveying device further comprises a picking instruction device that indicates the plurality of items to be taken out to a picker at the picking work area, the picking instruction device receiving instructions from said control unit and the operation commands from said conveying device controller for said conveying the plurality of items.

17. The logistics system according to claim 16, wherein the conveying device further comprises an out-of-storage conveyor that receives the operation commands from said conveying device controller for said conveying the plurality of items.

* * * * *